United States Patent
Ha et al.

(10) Patent No.: US 7,945,001 B2
(45) Date of Patent: May 17, 2011

(54) APPARATUS AND METHOD FOR RECEIVING DATA IN A WIRELESS COMMUNICATION SYSTEM USING BIT INTERLEAVING, SYMBOL INTERLEAVING AND SYMBOL MAPPING

(75) Inventors: Ji-Won Ha, Seoul (KR); Eun-Jeong Yim, Seongnam-si (KR); Hyun-Seok Oh, Seoul (KR); Jung-Wook Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 980 days.

(21) Appl. No.: 11/528,694

(22) Filed: Sep. 28, 2006

(65) Prior Publication Data

US 2007/0165729 A1    Jul. 19, 2007

(30) Foreign Application Priority Data

Sep. 28, 2005    (KR) .......................... 10-2005-0090561

(51) Int. Cl.
*H04L 27/06* (2006.01)
(52) U.S. Cl. ........................................................ 375/341
(58) Field of Classification Search .................. 375/240, 375/240.01, 240.02, 240.18, 240.26, 240.28, 375/259–262, 316, 340–342, 346; 714/699, 714/746, 786, 795; 708/100, 200, 400, 402–405; 370/203, 208, 210
See application file for complete search history.

(56) References Cited

U.S. PATENT DOCUMENTS

| | | | |
|---|---|---|---|
| 5,430,767 A * | 7/1995 | Min ................................. | 375/340 |
| 6,115,435 A * | 9/2000 | Harada et al. .................. | 375/341 |
| 6,662,337 B1 | 12/2003 | Brink ............................. | 714/792 |
| 2002/0159531 A1* | 10/2002 | Reagan et al. ................ | 375/260 |
| 2003/0123582 A1* | 7/2003 | Kim et al. ...................... | 375/347 |
| 2003/0142764 A1* | 7/2003 | Keevill et al. ................. | 375/341 |
| 2003/0235149 A1 | 12/2003 | Chan et al. .................... | 370/206 |
| 2004/0001564 A1 | 1/2004 | Chan et al. .................... | 375/341 |
| 2005/0105649 A1 | 5/2005 | Takizawa et al. ............. | 375/324 |
| 2006/0029162 A1* | 2/2006 | Chi ................................ | 375/340 |

FOREIGN PATENT DOCUMENTS

EP    1770939 A2    4/2007

* cited by examiner

*Primary Examiner* — David C Payne
*Assistant Examiner* — Vineeta S Panwalkar
(74) *Attorney, Agent, or Firm* — Roylance, Abrams, Berdo and Goodman, L.L.P.

(57) ABSTRACT

An apparatus and method are provided for receiving data generated by sequentially performing bit interleaving, symbol interleaving and symbol mapping in a wireless communication system. A fast Fourier transform (FFT) processor receives in-phase/quadrature phase (I/Q) data of a radio channel generated by sequentially performing bit interleaving, symbol interleaving and symbol mapping, and performs an FFT process for the I/Q data. A symbol deinterleaver performs a process for symbol deinterleaving the FFT I/Q data and reference values to be used for symbol demapping of the I/Q data and outputs the symbol-deinterleaved I/Q data and reference values. A symbol demapper performs a process for symbol demapping the symbol-deinterleaved I/Q data according to the reference values. A bit deinterleaver performs a process for bit deinterleaving the symbol-demapped data. A demultiplexer demultiplexes the bit-deinterleaved data.

21 Claims, 14 Drawing Sheets

APPARATUS AND METHOD FOR RECEIVING DATA IN A WIRELESS COMMUNICATION SYSTEM USING BIT INTERLEAVING, SYMBOL INTERLEAVING AND SYMBOL MAPPING

PRIORITY

This application claims the benefit under 35 U.S.C.§119(a) of a Korean Patent Application filed in the Korean Intellectual Property Office on Sep. 28, 2005 and assigned Serial No. 2005-90561, the entire disclosure of which is hereby incorporated by reference.

BACKGROUND OF THE INVENTION

1. Field of the Invention

The present invention generally relates to a digital video broadcasting (DVB) system. More particularly, the present invention relates to an apparatus and method for receiving data transmitted by employing bit interleaving, symbol interleaving and symbol mapping.

2. Description of the Related Art

A digital video broadcasting-handheld (DVB-H) system is a standard in which a 4K-mode fast Fourier transform (FFT) size, a multi-protocol encapsulation-forwarding error coding (MPE-FEC) function, a time-slicing function, a transmission parameter signaling (TPS) function, and the like are added to a DVB-terrestrial (DVB-T) system based on a European fixed digital television (DTV) standard in order to improve reception performance by considering a handheld service of a mobile channel's situation.

The DVB-H system transmits an audio/video (A/V) stream of a broadcast signal on the basis of an Internet protocol (IP). The DVB-H system can be exploited along with the DVB-T system using hierarchical modulation.

It is obvious that a data reception is a reverse operation to a data transmission. Thus, for reverse operations to bit interleaving, symbol interleaving and symbol mapping in a transmission stage of the DVB-H system, a reception stage sequentially performs symbol demapping, symbol deinterleaving and bit deinterleaving. However, when the symbol demapping is first performed before the symbol deinterleaving, a problem exists in that a memory size required for a symbol deinterleaver to use high order modulation such as 16/64-ary quadrature amplitude modulation (16/64-QAM) for the symbol mapping increases in proportion to the number of bits of a symbol-demapped soft value.

For example, the DVB system for supporting an FFT size in 8K mode will be described. When each soft value for configuring a demapped soft symbol from in-phase/quadrature phase (I/Q) data for subcarriers of an FFT unit is 7 bits and the modulation scheme is 64-QAM, the total number of memory bits required for the symbol deinterleaver is 6,048*6*7*2=508,032 bits. Herein, a value of 6,048 is the number of data subcarriers used in the 8K mode, a value of 6 is the number of soft values configuring the demapped soft symbol in the case of 64-QAM, a value of 7 is the number of bits of each soft value, and a value of 2 is the number of memories with the same size required for receiving the next input when a deinterleaved output is transmitted. A problem exists in that hardware complexity and power consumption are increased because the DVB system requires a large symbol deinterleaver memory of about 496K bits to support the 8K mode.

Accordingly, there is a need for an improved apparatus and method for receiving data in a wireless communication system that avoids an increase in hardware complexity and power consumption.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a transmission and reception method and apparatus that can avoid an increase in hardware complexity and power consumption.

Moreover, an aspect of exemplary embodiments of the present invention provides a method and apparatus that can reduce a memory size increasing in proportion to the number of bits of a symbol-demapped soft value when a high order modulation scheme such as 16/64-ary quadrature amplitude modulation (16/64-QAM) is used, by first performing symbol deinterleaving before symbol demapping in a digital video broadcasting (DVB) reception stage.

In accordance with an aspect of exemplary embodiments of the present invention, there is provided an apparatus for receiving data generated by sequentially performing bit interleaving, symbol interleaving and symbol mapping in a wireless communication system, in which a fast Fourier transform (FFT) processor receives in-phase/quadrature phase (I/Q) data of a radio channel generated by sequentially performing bit interleaving, symbol interleaving and symbol mapping, and performing an FFT process for the I/Q data; a symbol deinterleaver symbol deinterleaves the FFT I/Q data and reference values to be used for symbol demapping of the I/Q data and outputs the symbol-deinterleaved I/Q data and reference values, the symbol deinterleaving being mapped to the symbol interleaving; a symbol demapper symbol demaps the symbol-deinterleaved I/Q data to soft values with an appropriate number of bits according to the reference values, the symbol demapping being mapped to the symbol mapping; a bit deinterleaver bit deinterleaves the symbol-demapped data, the bit deinterleaving being mapped to the bit interleaving; and a demultiplexer demultiplexes the bit-deinterleaved data.

In accordance with another aspect of exemplary embodiments of the present invention, there is provided a method for receiving data generated by sequentially performing bit interleaving, symbol interleaving and symbol mapping in a wireless communication system, in which in-phase/quadrature phase (I/Q) data of a radio channel generated is received by sequentially performing bit interleaving, symbol interleaving and symbol mapping, and performing a fast Fourier transform (FFT) process for the I/Q data; the FFT I/Q data and reference values to be used for symbol demapping of the I/Q data are symbol deinterleaved and the symbol-deinterleaved I/Q data and reference values are output, the symbol deinterleaving being mapped to the symbol interleaving; the symbol-deinterleaved I/Q data is symbol demapped to soft values with an appropriate number of bits according to the reference values, the symbol demapping being mapped to the symbol mapping; the symbol-demapped data is bit deinterleaved, the bit deinterleaving being mapped to the bit interleaving; and the bit-deinterleaved data is demultiplexed.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As described below, the subject matter of exemplary embodiments of the present invention is to first perform symbol deinterleaving before symbol demapping without sequentially performing symbol demapping, symbol deinterleaving and bit deinterleaving in a reception stage when a transmission stage sequentially performs bit interleaving, symbol interleaving and symbol mapping. An example of a digital video broadcasting-terrestrial/handheld (DVB-T/H) system supporting orthogonal frequency division multiplexing (OFDM) in accordance with an exemplary embodiment of the present invention will be described below in detail. Applicability of the present invention is not limited to this exemplary embodiment. The present invention can be applied to all types of systems to which the following description applies.

First, a DVB-T/H transmission system will be described with reference to FIG. 1.

Figure 1:
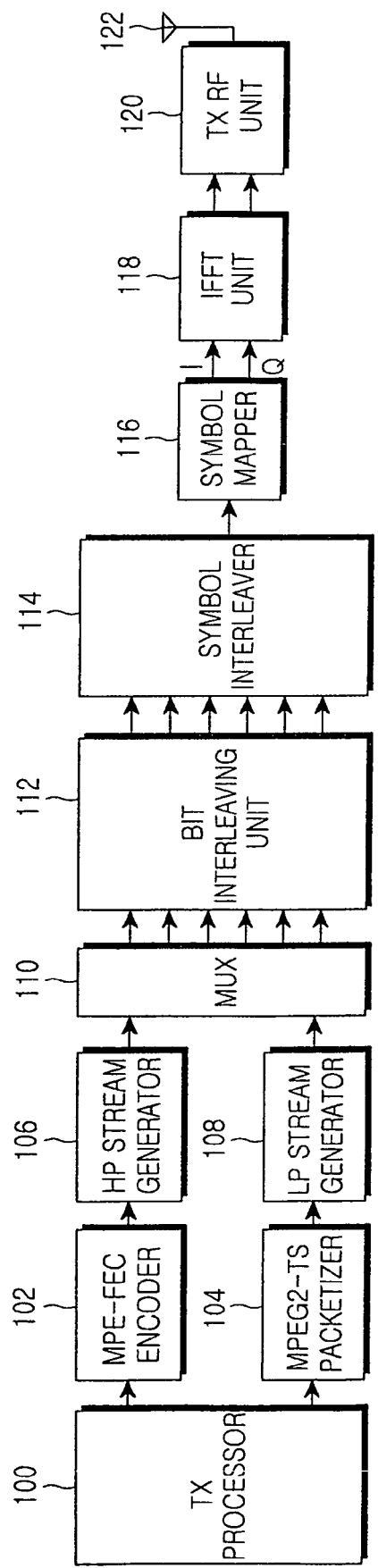
FIG. 1 illustrates a transmission structure of a digital video broadcasting (DVB)

Referring to FIG. 1, a transmission processor 100 generates Internet protocol (IP) packets for a DVB-H service to output the generated IP packets to a multi-protocol encapsulation-forwarding error coding (MPE-FEC) encoder 102 or generates a packetized elementary stream (PES) for a DVB-T service to output the generated PES to a moving picture experts group 2 (MPEG2)-transport stream (TS) packetizer 104. Data output to the MPE-FEC encoder 102 is an IP stream of a DVB-H signal. A signal output to the MPEG2-TS packetizer 104 is a PES corresponding to an audio/video (A/V) payload of the associated MPEG2-TS.

Figure 2:
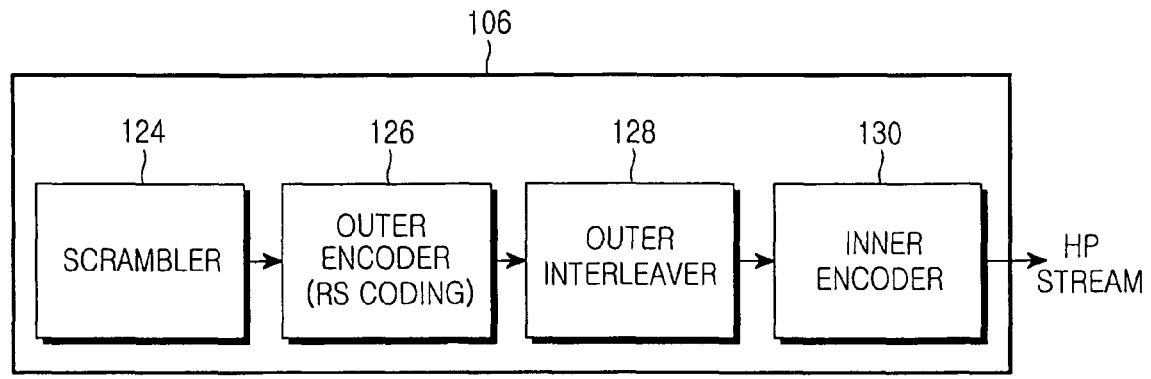
FIG. 2 illustrates an internal structure of a high priority (HP) stream generator in a DVB-handheld (DVB-H) system.
Figure 3:
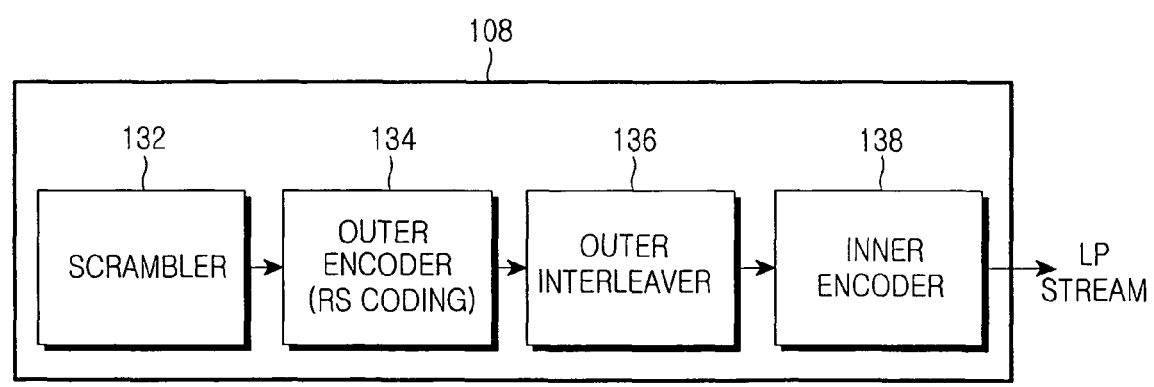
FIG. 3 illustrates an internal structure of a low priority (LP) stream generator in the DVB-H system.

The MPE-FEC encoder 102 performs MPE and Reed-Solomon (RS) encoding processes using the IP stream. An output of the MPE-FEC encoder 102 is input to a high priority (HP) stream generator 106. A structure of the HP stream generator 106 is illustrated in FIG. 2. Referring to FIG. 2, the output of the MPE-FEC encoder 102 is converted into an HP stream through a scrambler 124 for energy dispersal, an outer encoder 126, an outer interleaver 128 and an inner encoder 130. Similarly, the MPEG2-TS packetizer 104 generates an MPEG2-TS packet using the PES and then inputs the MPEG2-TS packet to a low priority (LP) stream generator 108. A structure of the LP stream generator 108 is illustrated in FIG. 3. Referring to FIG. 3, the MPEG2-TS packet is converted into an LP stream through a scrambler 132 for energy dispersal, an outer encoder 134, an outer interleaver 136 and an inner encoder 138. For example, the outer encoders 126 and 134 use RS codes, the outer interleaver 128 and 136 use convolutional interleaving, and the inner encoders 130 and 138 use puncturing-convolutional codes. The HP stream can have higher coding and modulation rates in comparison with the LP stream. Hierarchical modulation is performed through the stream generators 106 and 108 as described above.

The HP stream output from the HP stream generator 106 is input to an HP stream input port of a multiplexer (MUX) 110. The LP stream output from the LP stream generator 108 is input to an LP stream input port of the MUX 110. When the hierarchical modulation is used, the two streams output from the HP stream generator 106 and the LP stream generator 108 are input to the MUX 110. When non-hierarchical modulation is used, the stream output from the HP stream generator 106 is input to the MUX 110. The MUX 110 multiplexes the HP stream and the LP stream. When the predefined modulation is quadrature phase shift keying (QPSK), two outputs are transmitted. When the predefined modulation is 16-QAM, four outputs are transmitted. When the predefined modulation is 64-QAM, six outputs are transmitted. The operation of the MUX 110 and an operation subsequent thereto will be described when the above-described modulation scheme and the hierarchical modulation are used or not used.

Figure 4:
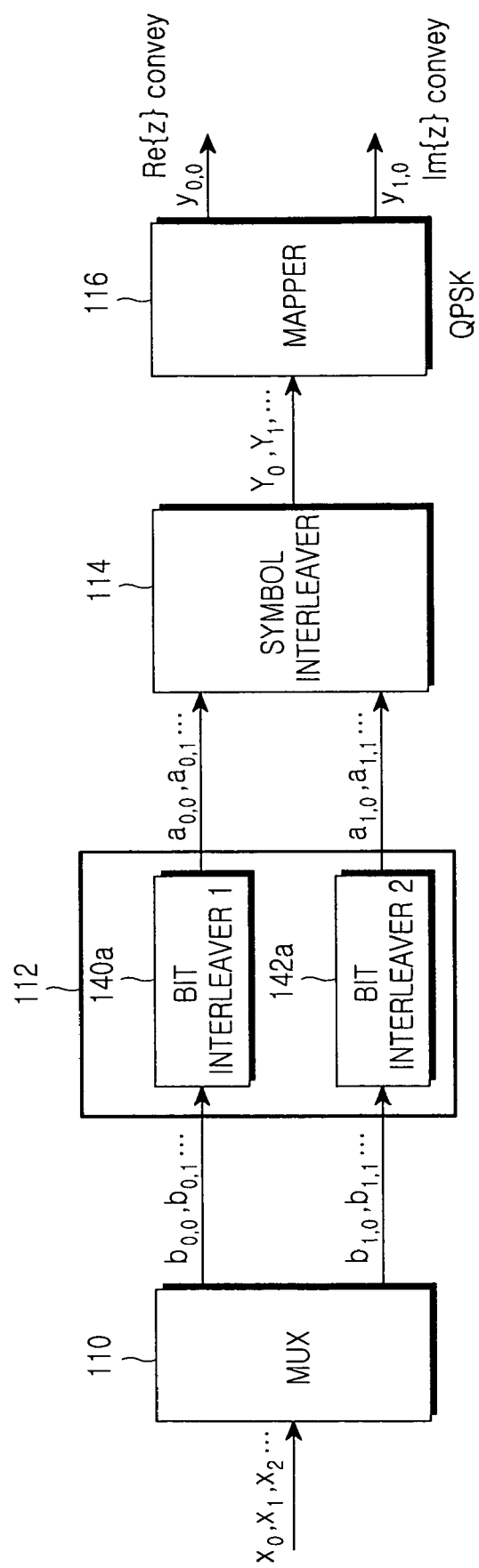
FIG. 4 illustrates a signal flow of a multiplexer, a bit interleaving unit and a symbol interleaver in the case of quadrature phase shift keying (QPSK) using non-hierarchical modulation.
Figure 5:
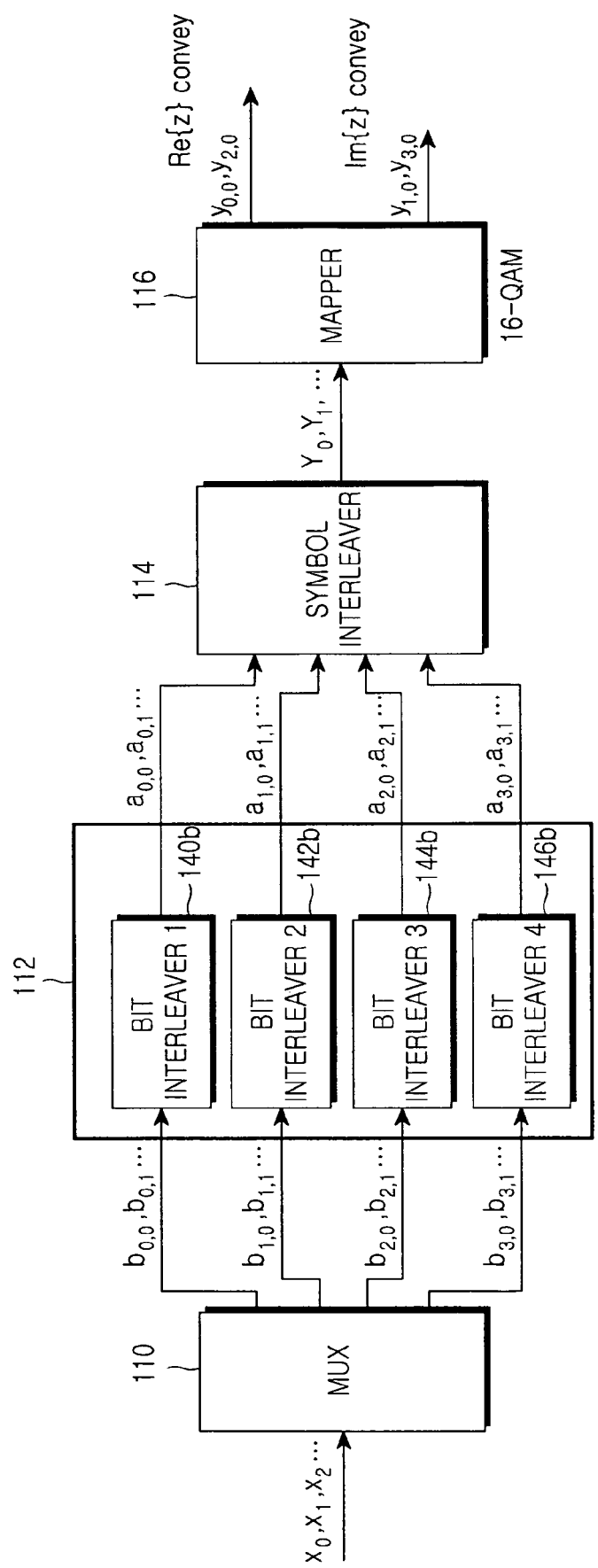
FIG. 5 illustrates a signal flow of the multiplexer, the bit interleaving unit and the symbol interleaver in the case of 16-ary quadrature amplitude modulation (16-QAM) using non-hierarchical modulation.
Figure 6:
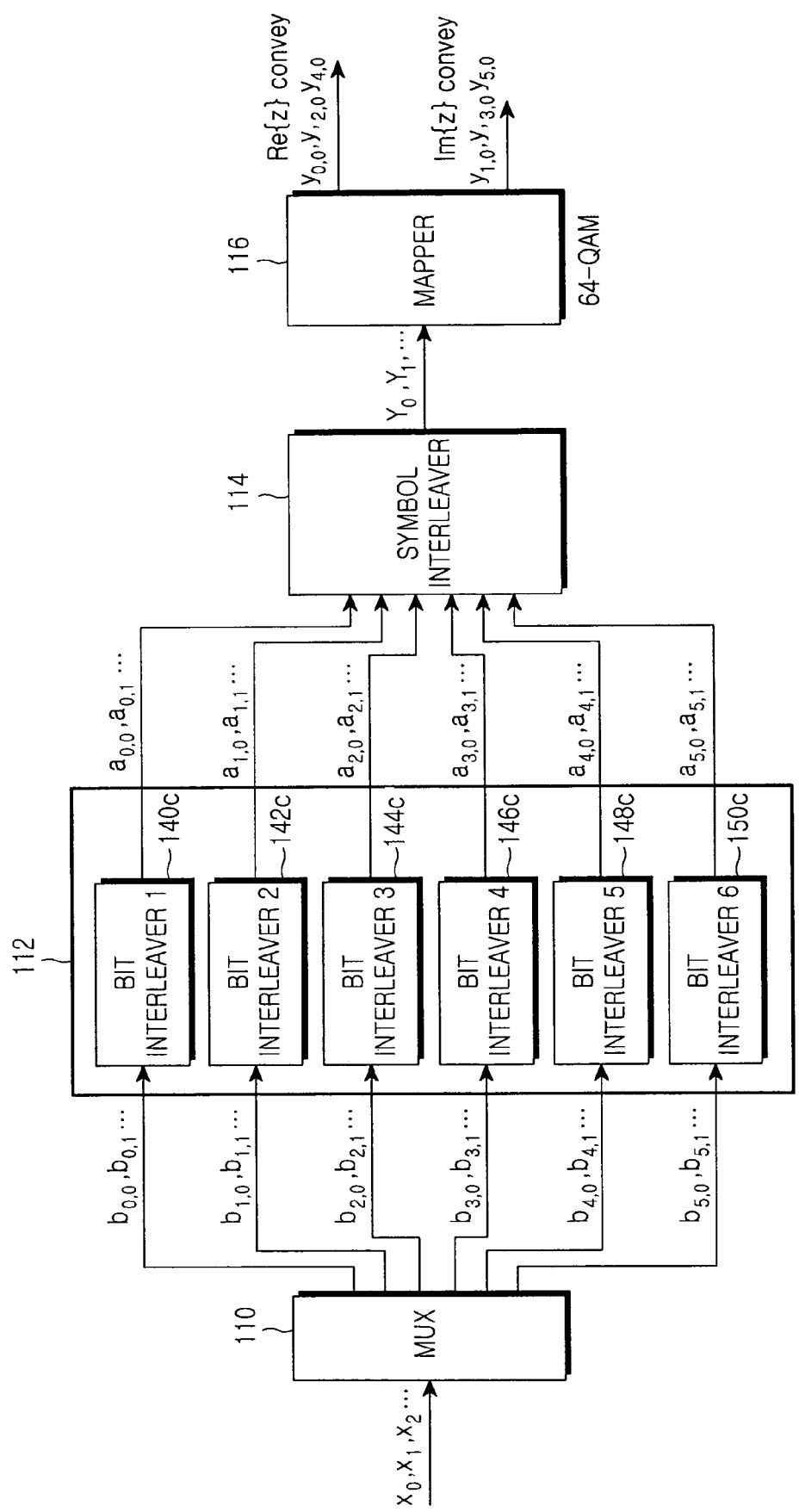
FIG. 6 illustrates a signal flow of the multiplexer, the bit interleaving unit and the symbol interleaver in the case of 64-ary quadrature amplitude modulation (64-QAM) using non-hierarchical modulation.
Figure 7:
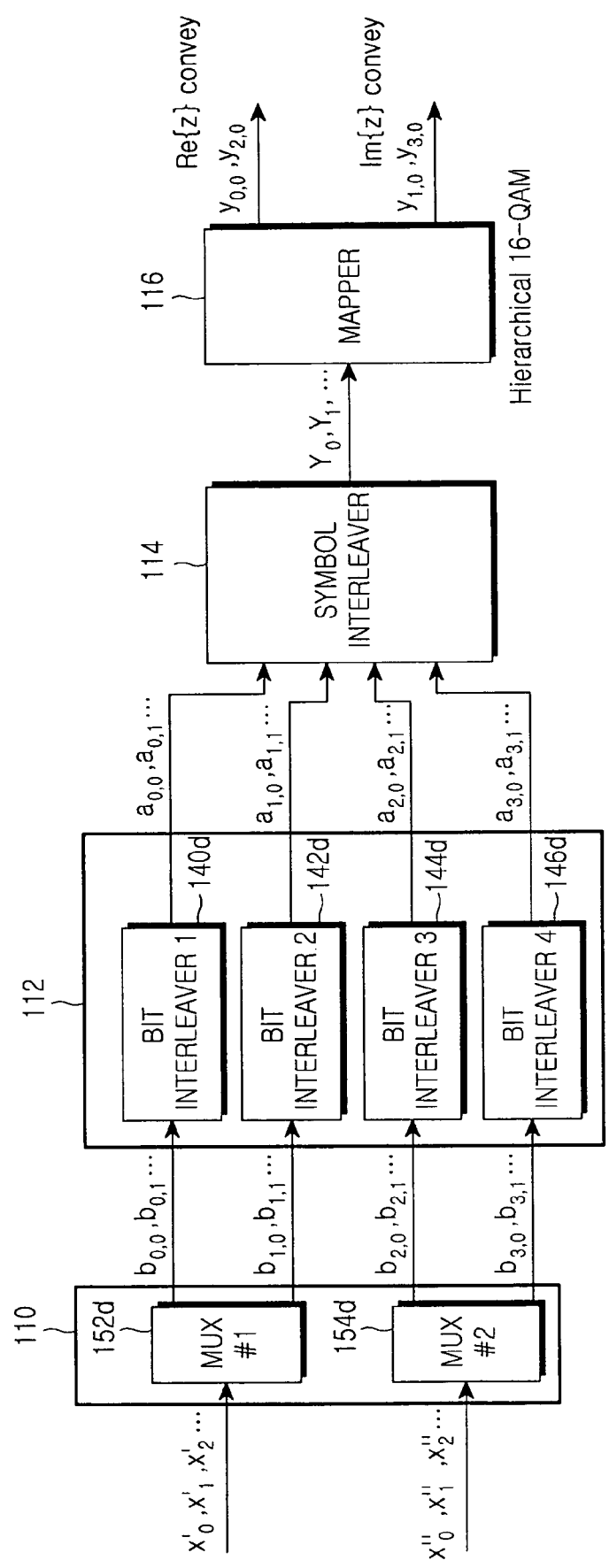
FIG. 7 illustrates a signal flow of the multiplexer, the bit interleaving unit and the symbol interleaver in the case of 16-QAM using hierarchical modulation.
Figure 8:
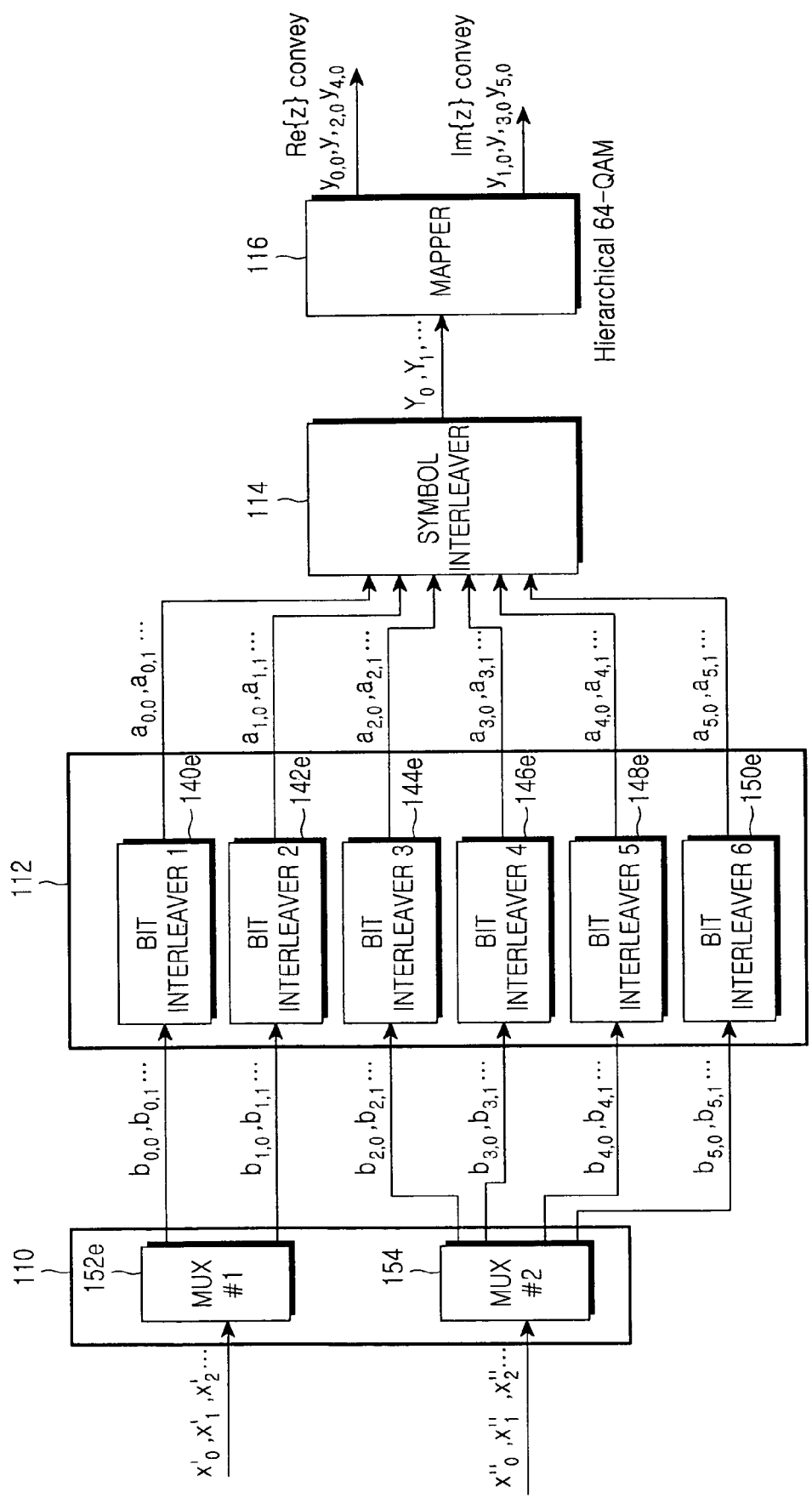
FIG. 8 illustrates a signal flow of the multiplexer, the bit interleaving unit and the symbol interleaver in the case of 64-QAM using hierarchical modulation.

FIG. 4 illustrates a signal flow of the MUX 110, a bit interleaving unit 112 and a symbol interleaver 114 in the case of QPSK using the non-hierarchical modulation. FIG. 5 illustrates a signal flow of the MUX 110, the bit interleaving unit 112 and the symbol interleaver 114 in the case of 16-QAM using the non-hierarchical modulation. FIG. 6 illustrates a signal flow of the MUX 110, the bit interleaving unit 112 and the symbol interleaver 114 in the case of 64-QAM using the non-hierarchical modulation. FIG. 7 illustrates a signal flow of the MUX 110, the bit interleaving unit 112 and the symbol interleaver 114 in the case of 16-QAM using the hierarchical modulation. FIG. 8 illustrates a signal flow of the MUX 110, the bit interleaving unit 112, and the symbol interleaver 114 in the case of 64-QAM using the hierarchical modulation.

The operation of the MUX 110 on an input stream of $x_0$, $x_1$, $x_2$, . . . according to the modulation scheme and the hierarchical modulation is as follows.

That is, because two bits construct one modulation symbol in the case of QPSK, $x_0$ is mapped to $b_{0,0}$ and $x_1$ is mapped to $b_{1,0}$.

Because four bits construct one modulation symbol in the case of a 16-QAM non-hierarchical transmission, $x_0$ is mapped to $b_{0,0}$, $x_1$ is mapped to $b_{2,0}$, $x_2$ is mapped to $b_{1,0}$, and $x_3$ is mapped to $b_{3,0}$.

In the case of a 64-QAM hierarchical transmission, $x'_0$ is mapped to $b_{0,0}$, $x'_1$ is mapped to $b_{1,0}$, $x''_0$ is mapped to $b_{2,0}$, $x''_1$ is mapped to $b_{4,0}$, $x''_2$ is mapped to $b_{3,0}$, and $x''_3$ is mapped to $b_{5,0}$.

Because six bits construct one modulation symbol in the case of a 64-QAM non-hierarchical transmission, $x_0$ is mapped to $b_{0,0}$, $x_1$ is mapped to $b_{2,0}$, $x_2$ is mapped to $b_{4,0}$, and $x_3$ is mapped to $b_{1,0}$, $x_4$ is mapped to $b_{3,0}$, and $x_5$ is mapped to $b_{5,0}$.

In the case of a 64-QAM hierarchical transmission, $x'_0$ is mapped to $b_{0,0}$, $x'_1$ is mapped to $b_{1,0}$, $x''_0$ is mapped to $b_{2,0}$, $x''_1$ is mapped to $b_{4,0}$, $x''_2$ is mapped to $b_{3,0}$, and $x''_3$ is mapped to $b_{5,0}$.

A memory size of each of the bit interleavers configuring the bit interleaving unit 112 is 126 bits. One bit interleaving unit 112 is formed by combining two bit interleavers (in the case of QPSK), four bit interleavers (in the case of 16-QAM), or six bit interleavers (in the case of 64-QAM) according to a used modulation scheme. That is, in FIG. 41 two bit interleavers 140a and 142a are provided in the case of the QPSK non-hierarchical transmission. Four bit interleavers 140b, 142b, 144b, and 146b are provided in the case of the 16-QAM non-hierarchical transmission in FIG. 5. Six bit interleavers 140c, 142c, 144c, 146c, 148c, and 150c are provided in the case of the 64-QAM non-hierarchical transmission in FIG. 6. Four bit interleavers 140d, 142d, 144d, and 146d are provided in the case of the 16-QAM hierarchical transmission in FIG. 7. Six bit interleavers 140e, 142e, 144e, 146e, 148e, and 150e are provided in the case of the 64-QAM hierarchical transmission in FIG. 8. For example, in the case of the hierarchical transmission, the MUX 110 is configured with two MUXs 152d/e and 154d/e for multiplexing different input bit streams as illustrated in FIGS. 7 and 8. Herein, the suffix a/b/c/d/e attached to reference numerals is used to identify the modulation scheme and the hierarchical modulation. Hereinafter, the suffix is omitted for clarity and conciseness.

An input bit vector B(e) for the bit interleavers 140, 142, 144, 146, 148, and 150 is defined as shown in Equation (1).

$$B(e) = (b_{e,0}, b_{e,1}, b_{e,2}, \ldots, b_{e,125})$$ Equation (1)

Herein, e is an integer capable of satisfying $0 \leq e \leq v-1$ and v is a constellation size or modulation order value. The v value is 2 in the case of QPSK, 4 in the case of 16-QAM, and 6 in the case of 64-QAM. The relationship between an input bit and each bit of $A(e) = (a_{e,0}, a_{e,1}, a_{e,2}, \ldots, a_{e,125})$ corresponding to an output bit vector of each bit interleaver is defined as shown in Equation (2).

$$a_{e,w} = b_{e,H_e(w)}$$ Equation (2)

Herein, $H_e(w)$ is a permutation function for bit interleaving and depends on each bit interleaver. The permutation function for each bit interleaver is defined as shown in Equation (3).

Bit Interleaver 1: $H_0(w) = w$

Bit Interleaver 2: $H_1(w) = (w+63) \mod 126$

Bit Interleaver 3: $H_2(w) = (w+105) \mod 126$

Bit Interleaver 4: $H_3(w) = (w+42) \mod 126$

Bit Interleaver 5: $H_4(w) = (w+21) \mod 126$

Bit Interleaver 6: $H_5(w) = (w+84) \mod 126$ Equation (3)

In the case of QPSK, the bit interleaving unit 112 of a v-bit size sets two outputs of the bit interleavers 140 and 142 to one symbol and then inputs the symbol to the symbol interleaver 114. In the case of 16-QAM, the bit interleaving unit 112 sets four outputs of the bit interleavers 140, 142, 144 and 146 to one symbol and then inputs the symbol to the symbol interleaver 114. In the case of 64-QAM, the bit interleaving unit 112 sets six outputs of the bit interleavers 140, 142, 144, 146, 148 and 150 to one symbol and then inputs the symbol to the symbol interleaver 114. Bits input to the symbol interleaver 114 are interleaved in a symbol unit. Symbols before interleaving are $y'_0, y'_1, y'_2, \ldots$ and symbols after interleaving are $y_0, y_1, y_2, \ldots$ That is, the symbol interleaver 114 performs an interleaving process for mapping v bits (of one symbol) corresponding to an output of the bit interleaving unit 112 to OFDM active carriers. The number of active carriers is 1,512 in the 2K mode, 3,024 in the 4K mode, and 6,048 in the 8K mode. When an input of the symbol interleaver 114 is $Y' = (y'_0, y'_1, y'_2, \ldots, y'_{N_{max}-1})$, a symbol-interleaved output $Y = (y_0, y_1, y_2, \ldots, y_{N_{max}-1})$ is expressed as shown in Equation (4).

$y_{H(q)} = y'_q$, $q = 0, \ldots, N_{max}-1$ for even OFDM symbol $y_q = y'_{H(q)}$, $q = 0, \ldots, N_{max}-1$ for even OFDM symbol  Equation (4)

Herein, H(q) indicates a symbol-interleaved output order for a q-th input symbol, and $N_{max}$ is the number of active carriers. A permutation function H for symbol interleaving is defined by a $(N_r-1)$-bit binary word $R'_i$. The $(N_r-1)$-bit binary word is a binary word constructed by $(N_r-1)$ bits. $N_r = \log_2 M_{max}$. $M_{max}$ is 2,048 in the 2K mode, 4,096 in the 4K mode, and 8,192 in the 8K mode. That is, $M_{max}$ is an FFT size in each FFT mode. Further, i is a time index. At this time, $R'_i$ is a vector defined by a rule of Equation (5).

$i = 0, 1$: $R'_i[N_{r-2}, N_{r-3}, \ldots, 1, 0] = 0, 0, \ldots, 0, 0$ $i = 2$: $R'_i[N_{r-2}, N_{r-3}, \ldots, 1, 0] = 0, 0, \ldots, 0, 0$ $2 < i < M_{max}$: $\{R'_i[N_{r-3}, N_{r-4}, \ldots, 1, 0] = R'_{i-1}[N_{r-2}, N_{r-3}, \ldots, 1]\};$ in the 2K mode: $R'_i[9] = R'_{i-1}[0] \oplus R'_{i-1}[3]$ in the 4K mode: $R'_i[10] = R'_{i-1}[0] \oplus R'_{i-1}[2]$ in the 8K mode: $R'_i[11] = R'_{i-1}[0] \oplus R'_{i-1}[1] \oplus R'_{i-1}[4] \oplus R'_{i-1}[6]$  Equation (5)

As a result of performing bit permutation according to an input $R'_i$ defined by Equation (5), H(q) is computed. A bit permutation rule is shown in Tables 1 to 3.

TABLE 1

Bit permutation in the 2K mode

| $R'_i$ bit positions | | | | | | | | | | |
|---|---|---|---|---|---|---|---|---|---|---|
| | 9 | 8 | 7 | 6 | 5 | 4 | 3 | 2 | 1 | 0 |
| $R_i$ bit positions | 0 | 7 | 5 | 1 | 8 | 2 | 6 | 9 | 3 | 4 |

TABLE 2

Bit permutation in the 4K mode

| $R'_i$ bit positions | | | | | | | | | | | |
|---|---|---|---|---|---|---|---|---|---|---|---|
| | 10 | 9 | 8 | 7 | 6 | 5 | 4 | 3 | 2 | 1 | 0 |
| $R_i$ bit positions | 7 | 10 | 5 | 8 | 1 | 2 | 4 | 9 | 0 | 3 | 6 |

TABLE 3

Bit permutation in the 8K mode

| $R'_i$ bit positions | | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| $R_i$ bit positions | 5 | 11 | 3 | 0 | 10 | 8 | 6 | 9 | 2 | 4 | 1 | 7 |

As shown in Tables 1 to 3, a bit position of $R'_i$ is permutated to that of $R_i$. Using a vector R constructed by $R_i$ obtained from the above tables, the permutation function H(q) is computed as shown in Equation (6).

$$q = 0 \quad \text{for } (i = 0; i < M_{max}; i = i+1)$$

$$\left\{ H(q) = \sum_{j=0}^{N_r-1} R_i(j) \cdot 2^j \text{ if } (H(q) < N_{max}), q = q+1; \right\}$$

Equation (6)

A size of each symbol, that is, the number of bits of one symbol, to be input to the symbol interleaver 114 is set according to the modulation scheme as in the bit interleaving unit 112. Symbols output from the symbol interleaver 114 are mapped in a symbol mapper 116 to the associated carriers along with a continuous/scatter (C/S) pilot and transmission parameter signaling (TPS). An inverse fast Fourier transform (IFFT) unit 118 performs IFFT (2K/4K/8K) and guard interval (GI) insertion processes for an output of the symbol mapper 116 according to the FFT mode. An output of the IFFT unit 118 is converted into a radio frequency (RF) signal in a transmission RF unit 120 and then is radiated through an antenna 122.

When a reception system mapped to the above-described transmission system is configured, symbol deinterleaving is first performed before symbol demapping in accordance with an exemplary embodiment of the present invention without sequentially performing symbol demapping, symbol deinterleaving, and bit deinterleaving.

When the number of bits of each of the in-phase/quadrature phase (I/Q) output values for subcarriers of an FFT unit is 8 in the system for supporting an FFT size in the 8K mode, a total memory size required for the symbol deinterleaving is 6,048*24*2=290,304. Herein, a value of 6,048 is the number of data subcarriers used in the 8K mode, a value of 24 is a sum of the number of bits (that is, 8 bits) of a reference value required for symbol demapping and the number of bits (that is, 8*2 bits) of a sum of I and Q values from the FFT unit, and a value of 2 is the number of memories with the same size required to receive the next input when a deinterleaved output is transmitted. It can be seen that exemplary implementations of the present invention can reduce the memory size required for the symbol deinterleaving by 217,728 bits in comparison with the prior art. This memory reduction effect increases as the number of bits of a symbol-demapped soft value increases.

Figure 9:
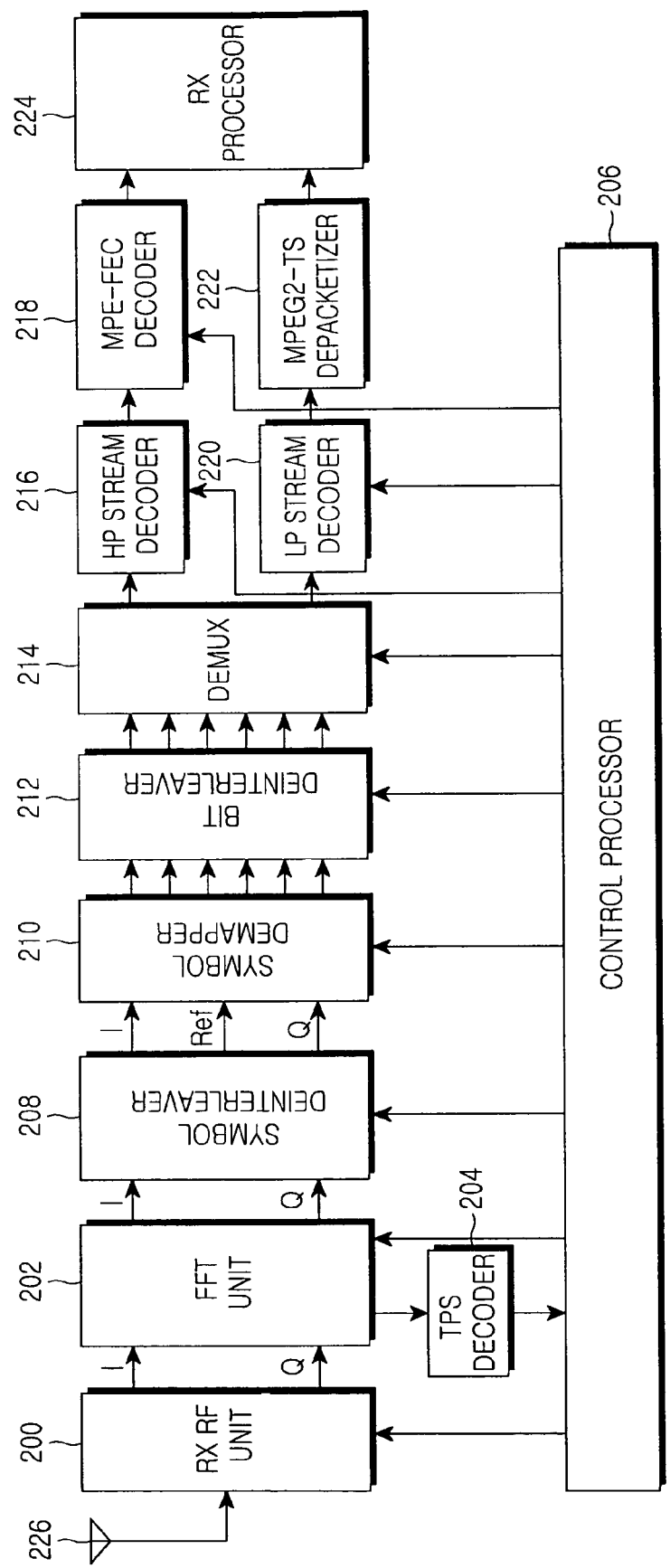
FIG. 9 illustrates a reception structure of a DVB-terrestrial/handheld (DVB-T/H) system in accordance with an exemplary embodiment of the present invention.

A detailed structure of an exemplary embodiment of the present invention will be described with reference to FIG. 9. FIG. 9 illustrates a structure of an overall system for processing received data by sequentially performing symbol deinterleaving, symbol demapping and bit deinterleaving in accordance with an exemplary embodiment of the present invention.

Referring to FIG. 9, an antenna 226 receives an RF signal of a DVB-T/H band radiated from the antenna 122 of the DVB-T/H transmission system. A reception RF unit 200 converts the RF signal received from the antenna 226 into a baseband signal. An FFT unit 202 mapped to the IFFT unit 118 removes a GI from the RF signal received by the reception RF processor 200. Further, the FFT unit 202 performs an FFT process for the signal from which the GI has been removed. A TPS decoder 204 decodes TPS bits in an output of the FFT unit 202 and detects control parameters. The control parameters include various information for interpreting a DVB-T/H signal such as an FFT size, a modulation scheme, an interleaving scheme, and the like, and are output to a control processor 206. A symbol deinterleaver 208 mapped to the symbol interleaver 114 performs a process for symbol deinterleaving the output of the FFT unit 202. A symbol demapper 210 mapped to the symbol mapper 116 performs a process for symbol demapping an output of the symbol deinterleaver 208.

A bit deinterleaver 212 mapped to the bit interleaving unit 112 deinterleaves an output of the symbol demapper 210 in a bit unit. A demultiplexer (DEMUX) 214 demultiplexes an output of the bit deinterleaver 212, and divides and outputs an HP stream and an LP stream. An HP stream decoder 216 mapped to the HP stream generator 106 decodes the HP stream and then outputs an encoded IP stream. An MPE-FEC decoder 218 outputs IP packets acquired by decoding the encoded IP stream to a reception processor 224. An LP stream decoder 220 mapped to the LP stream generator 108 decodes the LP stream and outputs MPEG2-TS packets. An MPEG2-TS depacketizer 222 decodes the MPEG2-TS packets and then outputs an acquired PES to the reception processor 224.

The reception processor 224 stores the IP stream and the PES or runs an application for allowing a user to recognize the associated output. The control processor 206 controls the devices 200, 202, 208, 210, 212, 214, 216, 218, 220, and 222 using control parameters, relating to a reception operation of the DVB system, extracted from the TPS decoder 204.

Herein, the structures and operations of the symbol deinterleaver 208, the symbol demapper 210, and the bit deinterleaver 212 corresponding to the main components of exemplary embodiments of the present invention will be described in detail.

First, the structure and operation of the symbol deinterleaver 208 will be described with reference to FIG. 10.

Figure 10:
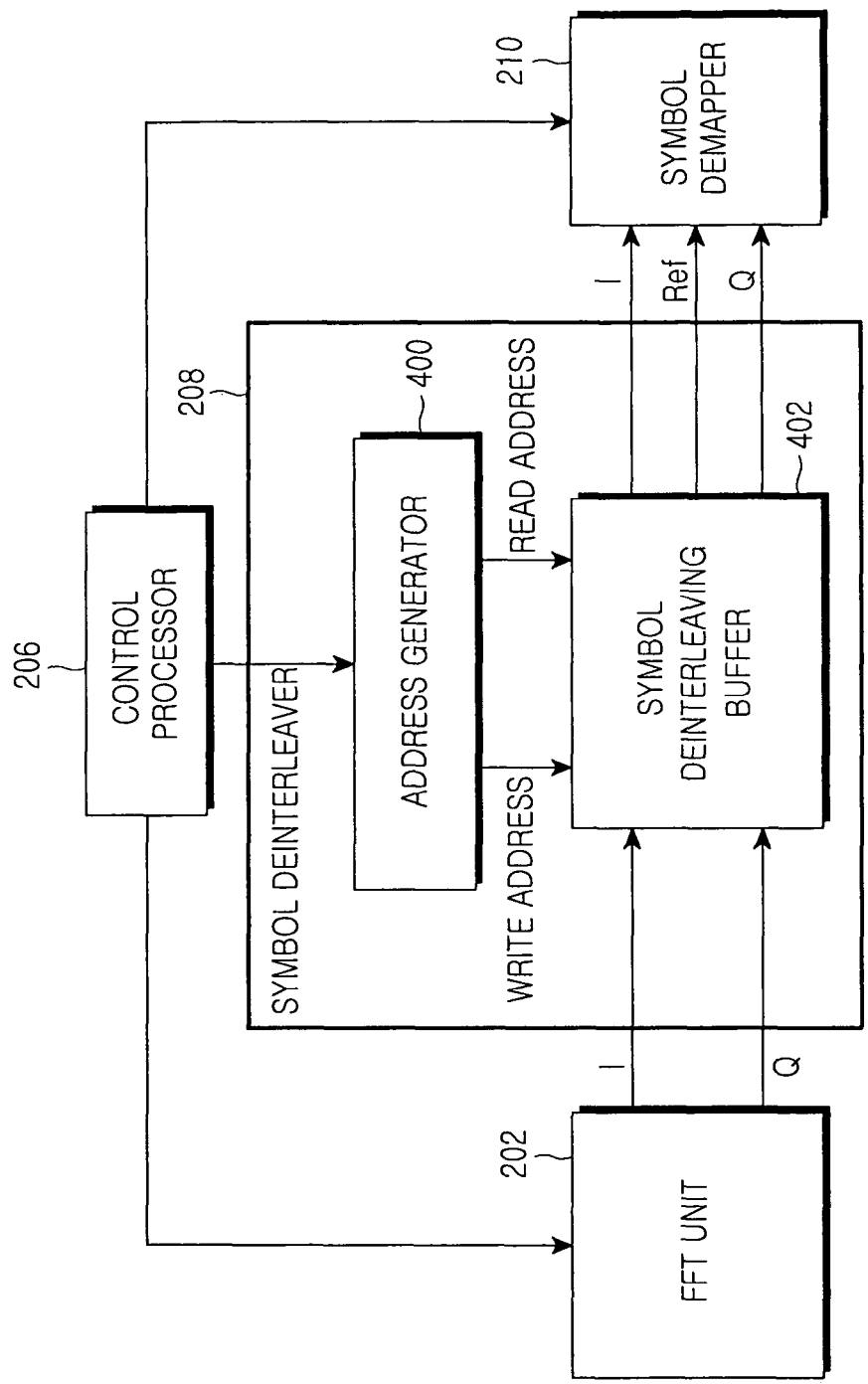
FIG. 10 illustrates an internal structure of a symbol deinterleaver in accordance with an exemplary embodiment of the present invention.

Referring to FIG. 10, the symbol deinterleaver 208 is provided with a symbol deinterleaving buffer 402 for storing data output from the FFT unit 202, and an address generator 400 for setting a position of data to be stored in, or read from, the symbol deinterleaving buffer 402. The symbol deinterleaver 208 receives I/Q values of subcarrier outputs from the FFT unit 202 and then stores the received I/Q values in an address region of the symbol deinterleaving buffer 402 corresponding to a write address generated from the address generator 400. As mentioned above, the I/Q values are configured with 8 bits, respectively. At this time, the write address is generated from the address generator 400 under control of the control processor 206. The control processor 206 controls the address generator 400 to generate proper addresses according to an FFT size, a modulation scheme, and an in-depth interleaving scheme detected by the TPS decoder 204.

The in-depth interleaving scheme is an interleaving scheme added to the 2K/4K mode of DVB-H and is used to obtain the interleaving effect on a time domain in a level equal to that of the 8K mode. A native interleaving scheme interleaves one OFDM symbol in the 2K/4K/8K modes, whereas the in-depth interleaving scheme interleaves four OFDM symbols in the 2K mode and two OFDM symbols in the 4K mode. That is, when the in-depth interleaving is used in the 2K/4K modes, the bit length of its interleaving depth is equal to that of 48*126 bits in the 8K mode. Because a method for generating addresses in various other interleaving schemes as well as the in-depth interleaving is not directly related to an exemplary embodiment of the present invention, a detailed description is omitted for clarity and conciseness.

According to a read address generated from the address generator 400, data (that is, I/Q values) recorded in the symbol deinterleaving buffer 402 are read in deinterleaving order. At this time, the read address is generated under control of the control processor 206.

The symbol deinterleaver 208 computes a reference value to be used to perform a process for symbol demapping the I/Q values received from the FFT unit 202. The symbol deinterleaver 208 sets the I/Q values and the reference (Ref) value to one symbol and performs the deinterleaving process in a symbol unit. That is, the reference value is stored in one address region along with the I/Q values according to the write address. The reference value and the I/Q values are simultaneously read at the read address.

Thus, when the symbol demapper 210 performs a process for symbol demapping the deinterleaved I/Q values, the symbol deinterleaving buffer 402 outputs the associated I/Q values and the reference (Ref) value indicative of a QAM reference level to the symbol demapper 210. The reference value is a factor determining a distance between signal points in a QAM constellation. For example, a reference point is at a minimum distance from a signal point closest to the origin to the I or Q axis in the constellation configured by the I and Q axes. The reference point is computed by the I and Q values received from the FFT unit 202. The computation scheme is defined by a pattern of a used constellation.

The structure and operation of the symbol demapper 210 will be described with reference to FIG. 11.

Figure 11:
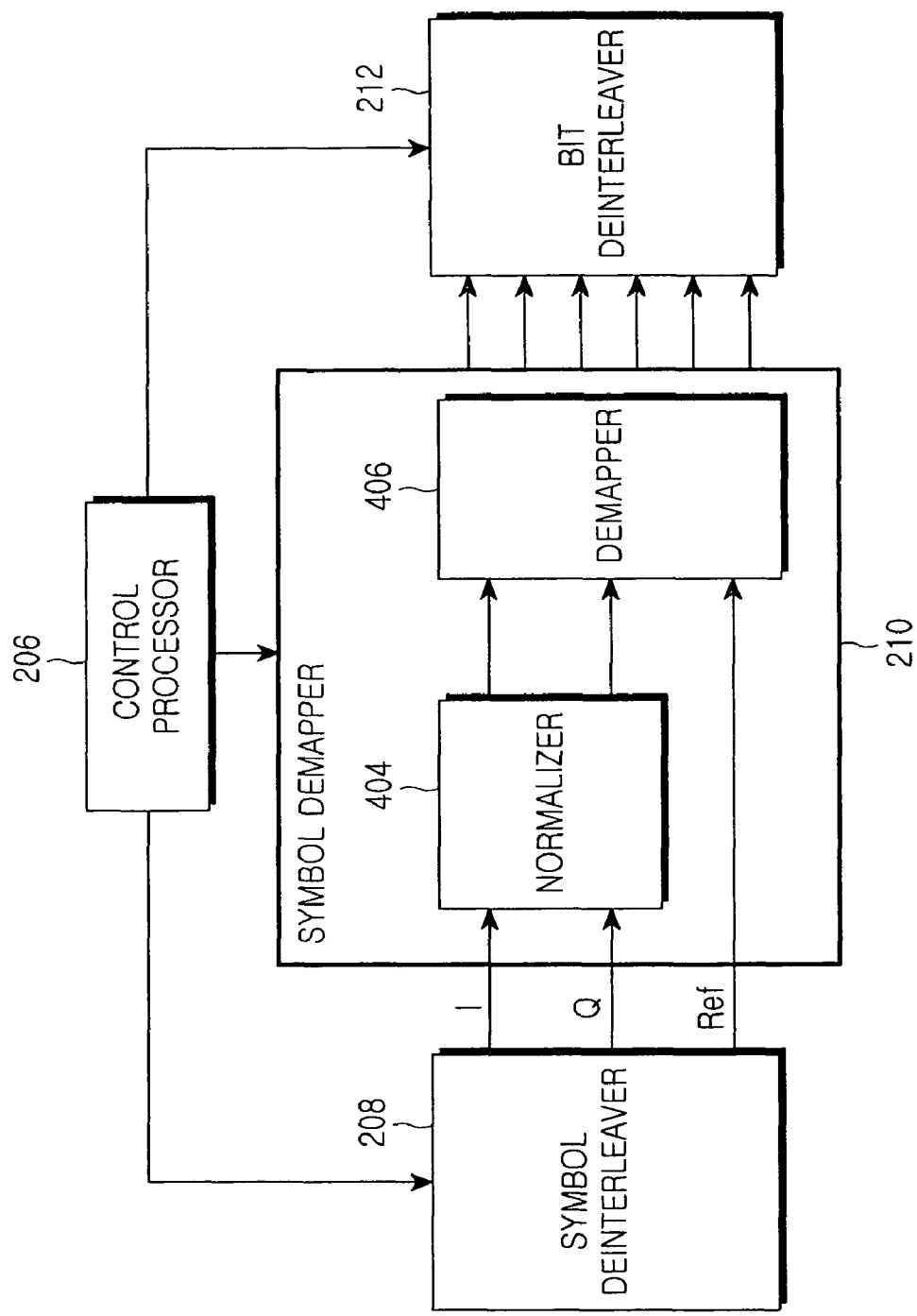
FIG. 11 illustrates an internal structure of a symbol demapper in accordance with an exemplary embodiment of the present invention.

Referring to FIG. 11, the symbol demapper 210 is provided with a normalizer 404 for appropriately normalizing the I/Q values output from the symbol deinterleaver 208 in each modulation scheme and a demapper 406 for actually performing a symbol demapping process using an output of the normalizer 404 and a QAM reference value provided from the symbol deinterleaver 208, under control of the control processor 206.

Because the operation of the symbol demapper 406 is not directly related to an exemplary embodiment of the present invention, a detailed description is omitted for clarity and conciseness. For example, any scheme such as a process for computing a log likelihood ratio (LLR) can be used to perform the QAM demapping process. Each symbol corresponding to an output of the symbol demapper 210 for the I/Q values is configured with two soft values in the case of QPSK, four soft values in the case of 16-QAM, and six soft values in the case of 64-QAM according to the modulation scheme. The soft values are output to the bit deinterleaver 212. For example, each of the soft values is configured with 7 bits.

The structure and operation of the bit deinterleaver 212 will be described with reference to FIG. 12.

Figure 12:
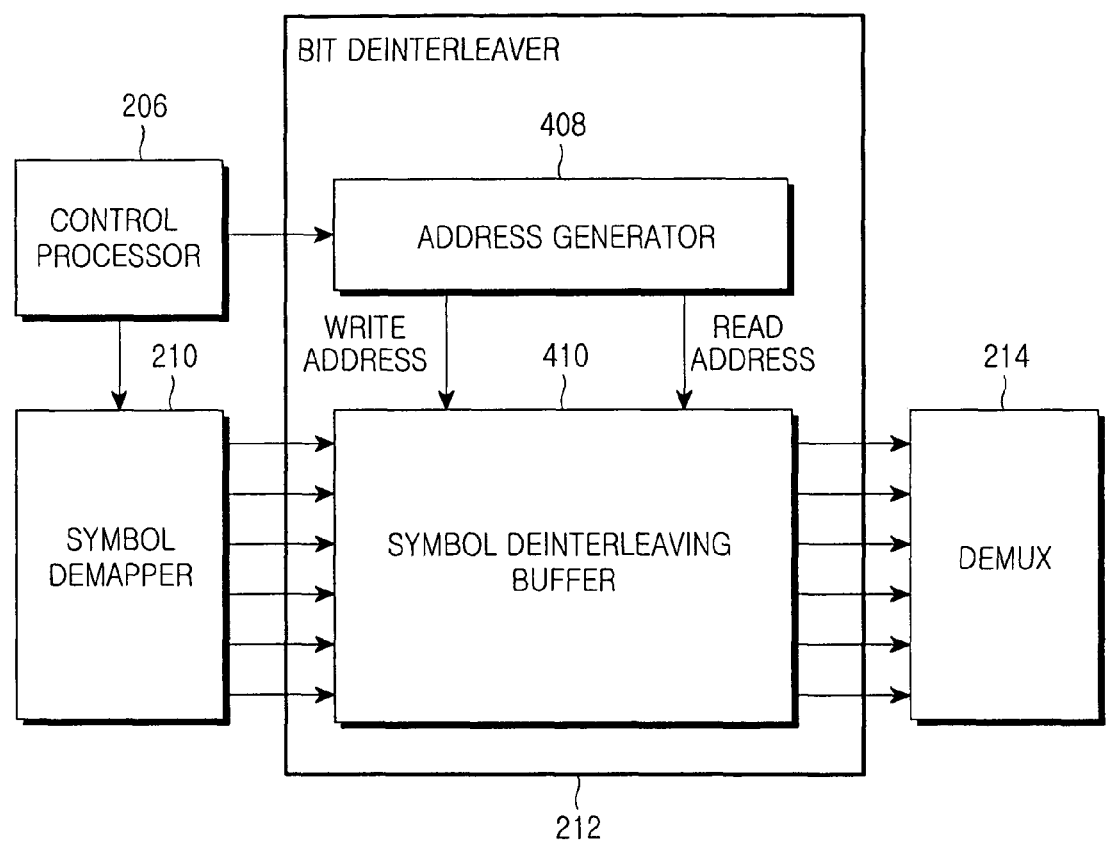
FIG. 12 illustrates an internal structure of a bit deinterleaver in accordance with an exemplary embodiment of the present invention.

Referring to FIG. 12, the bit deinterleaver 212 is provided with a symbol deinterleaving buffer 410 for storing data (that is, soft values) output from the symbol demapper 210 and an address generator 408 for setting a position of data to be stored in, or read from, the bit deinterleaving buffer 410. Write and read addresses designate a position of an address region relating to each soft value output from the symbol demapper 210.

The bit deinterleaving buffer 410 receives data output from the symbol demapper 210 and then stores the data in an associated address region of the bit deinterleaving buffer 410 corresponding to the write address generated from the address generator 408. At this time, the write address is generated from the address generator 408 under control of the control processor 206. The control processor 206 controls the address generator 408 to generate appropriate addresses according to a modulation scheme and a hierarchical modulation application detected by the TPS decoder 204. Because a method for generating addresses is not directly related to an exemplary embodiment of the present invention, a detailed description is omitted for clarity and conciseness.

Data recorded in the bit deinterleaving buffer 410 is read in deinterleaving order at a read address generated from the address generator 408. At this time, the read address is generated under control of the control processor 206. An output of the bit deinterleaver 212 is input to the DEMUX 214 and is appropriately demultiplexed according to a modulation scheme and a hierarchical modulation scheme.

A reception operation of the DVB-T/H system in accordance with an exemplary embodiment of the present invention will be described with reference to FIG. 13.

Figure 13:
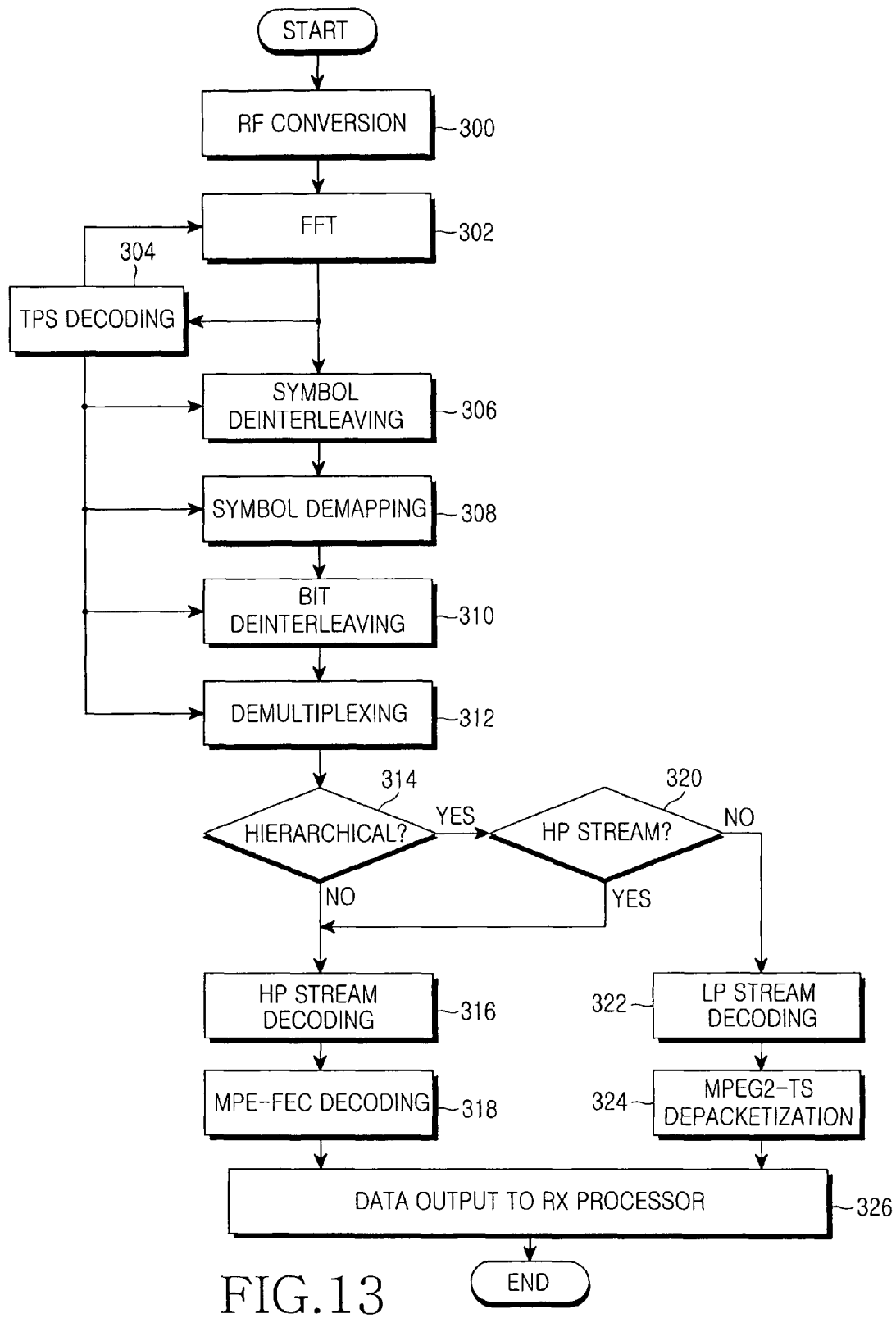
FIG. 13 is a flowchart illustrating a reception operation in accordance with an exemplary embodiment of the present invention.

Referring to FIG. 13, a terminal receives a DVB-T/H signal through an RF reception stage and converts the received DVB-T/H signal into a baseband signal in step 300. The terminal removes a GI from the baseband signal and then performs an FFT process for the signal from which the GI has been removed in step 302. Simultaneously, the terminal decodes TPS data from FFT data and acquires control parameters in step 304. The control parameters are used in subsequent steps (that is, steps 306 to 312) and also are used for a subsequently received signal in step 302. The terminal deinterleaves the FFT data in a symbol unit before symbol demapping in step 306 and then performs a process for symbol demapping the symbol-deinterleaved data in step 308. The symbol deinterleaving process is performed for each symbol including FFT I/Q values and an associated reference value in step 306. Then, the terminal performs a process for bit deinterleaving the symbol-demapped data in step 310 and then demultiplexes the bit-deinterleaved data in step 312.

On the other hand, the terminal determines whether the hierarchical modulation has been applied to the DVB-T/H signal in step 314. This determination can be made through the above-mentioned control parameters. In the case of the non-hierarchical modulation signal, the terminal proceeds to step 316 to decode an HP stream acquired by demultiplexing the bit-deinterleaved data and detect an IP stream. The terminal acquires IP packets by performing an MPE-FEC decoding process for the IP stream in step 318. On the other hand, when the associated signal is determined to be a hierarchical modulation signal in step 314, the terminal identifies an HP stream from the demultiplexed data in step 320.

In step 316, the terminal processes the HP stream as in the non-hierarchical modulation. In step 322, the terminal decodes the LP stream and detects PMEG2-TS packets. In step 324, the terminal acquires a PES by performing an PMEG2-TS depacketization process for the PMEG2-TS packets. The IP packets acquired in step 318 and the PES acquired in step 324 are transferred to the reception processor. The reception processor processes the IP packets and/or the PES, and stores the associated broadcast data or outputs the associated broadcast data such that the user can recognize it in step 326.

Figure 14:
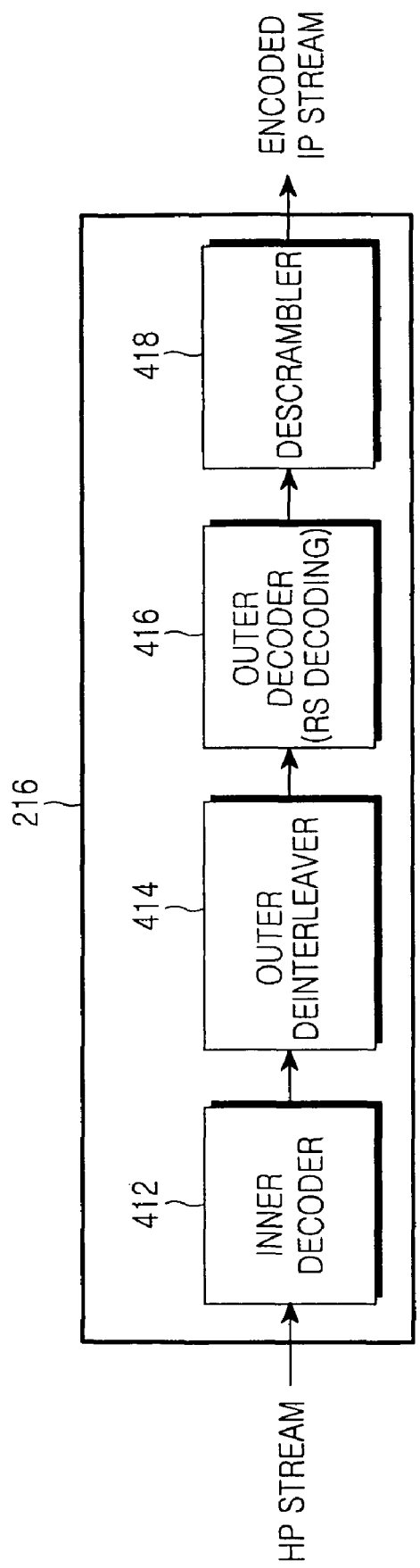
FIG. 14 illustrates an internal structure of an HP stream decoder in accordance with an exemplary embodiment of the present invention.
Figure 15:
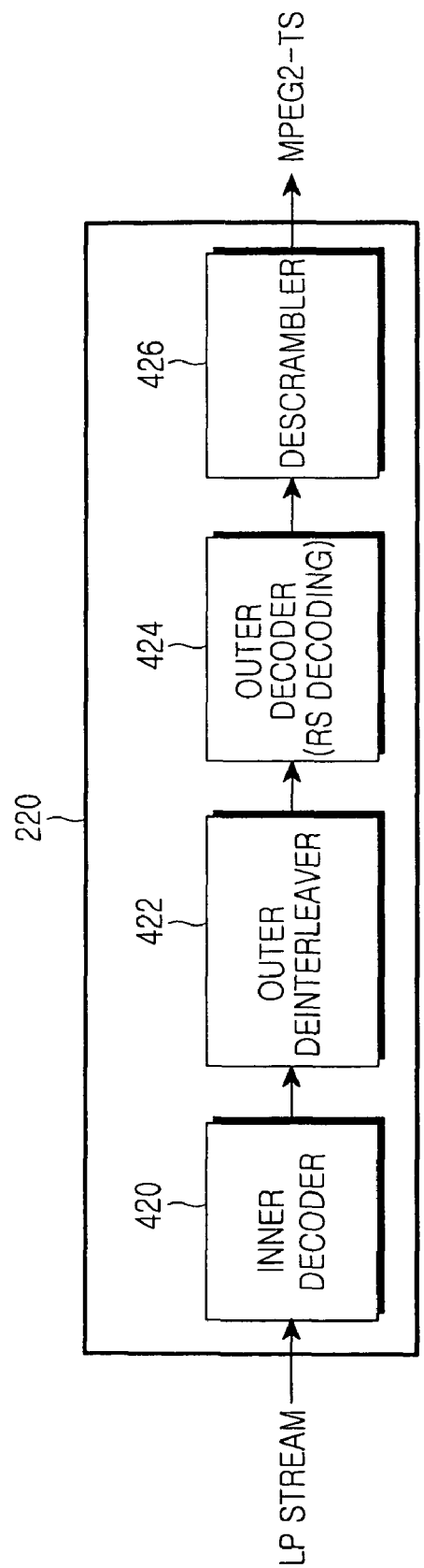
FIG. 15 illustrates an internal structure of an LP stream decoder in accordance with an exemplary embodiment of the present invention.

The structure of the HP stream decoder 216 for decoding the HP stream in step 316 is illustrated in FIG. 14, and the structure of the LP stream decoder 220 for decoding the LP stream in step 322 is illustrated in FIG. 15.

Referring to FIG. 14, the HP stream is input to the HP stream decoder 216. An inner decoder 412 performs an inner decoding process for the HP stream and then inputs the decoded stream to an outer deinterleaver 414. The outer deinterleaver 414 performs a convolutional-byte deinterleaving process for an output of the inner decoder 412. An outer decoder 416 performs an RS decoding process for an output of the outer deinterleaver 414. A descrambler 418 performs an energy dispersal descrambling process through an exclusive OR (XOR) operation on an output of the outer decoder 416 and a known pseudo random binary sequence (PRBS) signal. Each device of FIG. 14 mapped to each device of the HP stream generator 106 of FIG. 2 uses decoding and deinterleaving schemes.

Referring to FIG. 15, an LP stream is input to an LP stream decoder 220. An inner decoder 420 performs an inner decoding process for the LP stream and then inputs the decoded LP stream to an outer deinterleaver 422. The outer deinterleaver 422 performs a convolutional-byte deinterleaving process for an output of the inner decoder 420. An outer decoder 424 performs an RS decoding process for an output of the outer deinterleaver 422. A descrambler 426 performs an energy dispersal descrambling process through an XOR operation on an output of the outer decoder 424 and a PRBS signal. Each device of FIG. 15 mapped to each device of the LP stream generator 108 of FIG. 3 uses decoding and deinterleaving schemes.

As described above, exemplary embodiments of the present invention have the following effects.

In a high order modulation scheme such as 16/64-QAM, a memory size required for symbol deinterleaving increases as the number of bits of a symbol-demapped soft value increases. However, a system proposed in the exemplary embodiments of the present invention can significantly reduce a memory size required for symbol deinterleaving by performing a process for symbol deinterleaving I/Q values before symbol demapping. Thus, the system can reduce hardware complexity and power consumption.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, function programs, codes, and code segments run by the machine apparatus of the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for receiving data generated by sequentially performing bit interleaving, symbol interleaving and symbol mapping in a wireless communication system, comprising:
    a fast Fourier transform (FFT) unit for receiving in-phase/quadrature phase (I/Q) data of a radio channel generated by sequentially performing bit interleaving, symbol interleaving and symbol mapping, and performing an FFT process for the I/Q data;
    a symbol deinterleaver for symbol deinterleaving the FFT I/Q data and outputting the symbol-deinterleaved I/Q data and reference values to be used for symbol demapping of the I/Q data, the symbol deinterleaving being mapped to the symbol interleaving;
    a symbol demapper for symbol demapping the symbol-deinterleaved I/Q data according to the reference values received from the symbol deinterleaver, the symbol demapping being mapped to the symbol mapping; and
    a bit deinterleaver for bit deinterleaving the symbol-demapped data, the bit deinterleaving being mapped to the bit interleaving.

2. The apparatus of claim 1, wherein the symbol deinterleaver comprises:
    an address generator for generating write and read addresses according to an FFT size of the FFT unit, and modulation and interleaving schemes applied to the received I/Q data; and
    a symbol deinterleaving buffer for storing the FFT I/Q data and the reference values in an address region corresponding to the write addresses and outputting the stored I/Q data and reference values at the read addresses.

3. The apparatus of claim 1, wherein the symbol demapper comprises:
    a normalizer for normalizing the symbol-deinterleaved I/Q data according to a modulation scheme applied to the received I/Q data; and
    a demapper for symbol demapping the normalized I/Q data according to the reference values and outputting symbol-demapped soft values according to the modulation scheme.

4. The apparatus of claim 1, wherein the bit deinterleaver comprises:
an address generator for generating write and read addresses according to presence of hierarchical modulation and a modulation scheme applied to the received I/Q data; and
a bit deinterleaving buffer for storing the symbol-demapped data in an address region corresponding to the write addresses and outputting the stored I/Q data at the read addresses.

5. The apparatus of claim 2, further comprising a control processor for receiving control parameters and controlling the address generator to generate write and read addresses according to the FFT size, a modulation scheme, and an in-depth interleaving scheme detected by a transmission parameter signaling (TPS) decoder.

6. The apparatus of claim 5, wherein the control parameters comprise information for interpreting a digital video broadcasting terrestrial/handheld (DVB-T/H) signal comprising the FFT size, the modulation scheme, and the interleaving scheme.

7. The apparatus of claim 5, wherein the TPS decoder decodes TPS bits in an output of the FFT unit and detects the control parameters.

8. A method for receiving data generated by sequentially performing bit interleaving, symbol interleaving and symbol mapping in a wireless communication system, the method comprising:
receiving in-phase/quadrature phase (I/Q) data of a radio channel generated by sequentially performing bit interleaving, symbol interleaving and symbol mapping, and performing a fast Fourier transform (FFT) process for the I/Q data;
symbol deinterleaving the FFT I/Q data and outputting the symbol-deinterleaved I/Q data and reference values to be used for symbol demapping of the I/Q data, the symbol deinterleaving being mapped to the symbol interleaving;
symbol demapping the symbol-deinterleaved I/Q data according to the symbol-deinterleaved reference values, the symbol demapping being mapped to the symbol mapping; and
bit deinterleaving the symbol-demapped data, the bit deinterleaving being mapped to the bit interleaving.

9. The method of claim 8, wherein the symbol deinterleaving comprises:
generating write and read addresses according to an FFT size of the FFT process, and modulation and interleaving schemes applied to the received I/Q data;
storing the FFT I/Q data and the reference values in an address region corresponding to the write addresses; and
outputting the stored I/Q data and reference values at the read addresses.

10. The method of claim 8, wherein the symbol demapping comprises:
normalizing the symbol-deinterleaved I/Q data according to a modulation scheme applied to the received I/Q data;
symbol demapping the normalized I/Q data according to the symbol-deinterleaved reference values; and
outputting symbol-demapped soft values according to the modulation scheme.

11. The method of claim 8, wherein the bit deinterleaving comprises:
generating write and read addresses according to presence of hierarchical modulation and a modulation scheme applied to the received I/Q data;
storing the symbol-demapped data in an address region corresponding to the write addresses; and
outputting the stored I/Q data at the read addresses.

12. The method of claim 8, further comprising receiving control parameters and controlling the generating of write and read addresses to generate addresses according to the FFT size, a modulation scheme, and an in-depth interleaving scheme detected by a transmission parameter signaling (TPS) decoder.

13. The apparatus of claim 12, wherein the control parameters comprise information for interpreting a digital video broadcasting terrestrial/handheld (DVB-T/H) signal comprising the FFT size, the modulation scheme, and the interleaving scheme.

14. The apparatus of claim 12, wherein the TPS decoder decodes TPS bits in an output of the FFT unit and detects control parameters.

15. A computer-readable recording medium storing a computer program code for performing a method for receiving data generated by sequentially performing bit interleaving, symbol interleaving and symbol mapping in a wireless communication system, the code comprising executable instructions for:
receiving in-phase/quadrature phase (I/Q) data of a radio channel generated by sequentially performing bit interleaving, symbol interleaving and symbol mapping, and performing a fast Fourier transform (FFT) process for the I/Q data;
symbol deinterleaving the FFT I/Q data and outputting the symbol-deinterleaved I/Q data and reference values to be used for symbol demapping of the I/Q data, the symbol deinterleaving being mapped to the symbol interleaving;
symbol demapping the symbol-deinterleaved I/Q data according to the reference values received from the symbol deinterleaver, the symbol demapping being mapped to the symbol mapping; and
bit deinterleaving the symbol-demapped data, the bit deinterleaving being mapped to the bit interleaving.

16. The method of claim 15, wherein the symbol deinterleaving comprises:
generating write and read addresses according to an FFT size of the FFT process, and modulation and interleaving schemes applied to the received I/Q data;
storing the FFT I/Q data and the reference values in an address region corresponding to the write addresses; and
outputting the stored I/Q data and reference values at the read addresses.

17. The method of claim 15, wherein the symbol demapping comprises:
normalizing the symbol-deinterleaved I/Q data according to a modulation scheme applied to the received I/Q data;
symbol demapping the normalized I/Q data according to the reference values; and
outputting symbol-demapped soft values according to the modulation scheme.

18. The method of claim 15, wherein the bit deinterleaving comprises:
generating write and read addresses according to presence of hierarchical modulation and a modulation scheme applied to the received I/Q data;
storing the symbol-demapped data in an address region corresponding to the write addresses; and
outputting the stored I/Q data at the read addresses.

19. The method of claim 16, further comprising receiving control parameters and controlling the generating of write and read addresses to generate addresses according to the FFT size, a modulation scheme, and an in-depth interleaving scheme detected by a transmission parameter signaling (TPS) decoder.

20. The method of claim 19, wherein the control parameters comprise information for interpreting a digital video broadcasting terrestrial/handheld (DVB-T/H) signal comprising the FFT size, the modulation scheme, and the interleaving scheme.

21. The method of claim 19, wherein the TPS decoder decodes TPS bits in an output of the FFT unit and detects control parameters.

* * * * *